US012386287B2

(12) United States Patent
Matsumoto

(10) Patent No.: US 12,386,287 B2
(45) Date of Patent: Aug. 12, 2025

(54) UNIT LOCATING MECHANISM AND IMAGE FORMING APPARATUS

(71) Applicant: KYOCERA Document Solutions Inc., Osaka (JP)

(72) Inventor: Hiromu Matsumoto, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 18/809,980

(22) Filed: Aug. 20, 2024

(65) Prior Publication Data

US 2025/0068102 A1 Feb. 27, 2025

(51) Int. Cl.

| | |
|---|---|
| ***G03G 15/16*** | (2006.01) |
| ***G03G 15/01*** | (2006.01) |
| ***G03G 21/16*** | (2006.01) |
| ***G03G 21/18*** | (2006.01) |

(52) U.S. Cl.

CPC ..... *G03G 15/1685* (2013.01); *G03G 15/0131* (2013.01); *G03G 15/0189* (2013.01); *G03G 15/1605* (2013.01); *G03G 21/1619* (2013.01); *G03G 21/1623* (2013.01); *G03G 21/1628* (2013.01); *G03G 21/1633* (2013.01); *G03G 21/1647* (2013.01); *G03G 21/168* (2013.01); *G03G 21/1842* (2013.01)

(58) Field of Classification Search

CPC ........... G03G 15/1685; G03G 15/0131; G03G 15/0189; G03G 15/1605; G03G 21/1619; G03G 21/1623; G03G 21/1628; G03G 21/1633; G03G 21/1647; G03G 21/168; G03G 21/1842

See application file for complete search history.

(56) References Cited

U.S. PATENT DOCUMENTS

| | | | | |
|---|---|---|---|---|
| 2013/0308983 A1* | 11/2013 | Takano | G03G 21/1666 | 399/205 |
| 2015/0185685 A1* | 7/2015 | Takemoto | G03G 21/1661 | 399/393 |
| 2023/0375955 A1* | 11/2023 | Imaizumi | G03G 15/0283 | |
| 2024/0167304 A1 | 5/2024 | Son | E05C 3/14 | |

FOREIGN PATENT DOCUMENTS

WO WO 2022/201982 A1 9/2022

* cited by examiner

*Primary Examiner* — Joseph S Wong

(74) *Attorney, Agent, or Firm* — Stein IP, LLC

(57) ABSTRACT

A unit locating mechanism includes a first unit, a second unit and a locating member. The locating member includes a cylindrical portion, a hook portion and a portion to be restricted. The second unit includes a unit-side portion, a support shaft and a restriction portion. The restriction portion overlaps, in a state where the hook portion engages with a boss portion, the portion to be restricted from outside in a predetermined direction. The unit locating mechanism includes a torsion coil spring. A first arm portion engages with the locating member, and a second arm portion engages with the unit-side portion such that the torsion coil spring biases the locating member in a direction which causes the hook portion to engage with the boss portion.

4 Claims, 13 Drawing Sheets

UNIT LOCATING MECHANISM AND IMAGE FORMING APPARATUS

INCORPORATION BY REFERENCE

This application is based upon and claims the benefit of priority from the corresponding Japanese Patent Application No. 2023-135531, filed on Aug. 23, 2023, the entire contents of which are incorporated herein by reference.

BACKGROUND

The present disclosure relates to unit locating mechanisms and image forming apparatuses.

A conventional image forming apparatus includes a unit which can be turned with one end edge used as a support point. For example, the unit is conventionally a cover member.

Conventionally, for example, the hook portion of a locating member engages with a unit to restrict the turning of the unit. In other words, the unit is located. When in this configuration, the locating member is shifted (for example, the locating member drops off), the unit is also shifted. However, when the locating member is fixed so as not to be shifted, it is difficult to disassemble the locating member and an area therearound.

SUMMARY

A unit locating mechanism according to a first aspect of the present disclosure includes a first unit, a second unit and a locating member. The first unit includes a boss portion. The second unit can be displaced between a first position located with respect to the first unit and a second position other than the first position by being turned around an axis line extending in a predetermined direction. The locating member retains the second unit in the first position. The locating member includes a cylindrical portion, a hook portion and a portion to be restricted. In the cylindrical portion, the predetermined direction is the direction of a cylindrical shaft. The hook portion is arranged radially outward of the cylindrical portion when viewed in the predetermined direction and engages with the boss portion so as to hold the boss portion from one side in a circumferential direction around the center of the cylindrical shaft of the cylindrical portion. The portion to be restricted is arranged radially outward of the cylindrical portion and in a position different from the hook portion in the circumferential direction when viewed in the predetermined direction. The second unit includes a unit-side portion, a support shaft and a restriction portion. The support shaft protrudes outward in the predetermined direction from the unit-side portion, the cylindrical portion is fitted from outside in the predetermined direction and the support shaft supports the locating member such that the locating member can be displaced in the circumferential direction. The restriction portion is arranged on the turning path of the portion to be restricted which is turned around the center of the cylindrical shaft of the cylindrical portion when viewed in the predetermined direction. The hook portion engages with the boss portion when the second unit is in the first position to restrict the turning of the second unit from the first position to the second position. The restriction portion overlaps, in a state where the hook portion engages with the boss portion, the portion to be restricted from the outside in the predetermined direction so as to restrict movement of the locating member outward in the predetermined direction. The unit locating mechanism further includes a torsion coil spring that includes a winding spring portion which is arranged on the cylindrical portion, a first arm portion which extends from one end of the winding spring portion and a second arm portion which extends from the other end of the winding spring portion. The first arm portion engages with the locating member, and the second arm portion engages with the unit-side portion such that the torsion coil spring biases the locating member in a direction which causes the hook portion to engage with the boss portion.

An image forming apparatus according to a second aspect of the present disclosure includes the unit locating mechanism described above. The first unit is a unit that includes an image carrying member which carries an image. The second unit is a unit that includes a transfer roller which is pressed against the image carrying member. The image forming apparatus conveys a sheet into a transfer nip formed between the image carrying member and the transfer roller, and the image is transferred to the sheet.

DETAILED DESCRIPTION

An image forming apparatus 100 according to an embodiment of the present disclosure and an image forming apparatus 100 according to a variation of the embodiment will be described below with reference to FIGS. 1 to 13. Although in the following description, a color laser printer which can perform a print job for printing an image on a sheet S is used as an example, the present disclosure is not limited to a printer, and can be applied to a multi-functional peripheral which has a copying function and the like.

In the following description, a direction perpendicular to a flat floor surface on which the image forming apparatus 100 is installed is defined as an up/down direction, and the up/down direction is identified with a symbol D. Of horizontal directions orthogonal to the up/down direction D, one direction is identified with a symbol D1, and the other direction orthogonal to the one direction D1 is identified with a symbol D2.

For example, the one direction D1 is the width direction (left/right direction) of the image forming apparatus 100. In the following description, the one direction D1 is referred to as the width direction D1. The width direction D1 corresponds to a "predetermined direction". The other direction D2 is the forward/backward direction of the image forming apparatus 100. In the following description, the other direction D2 is referred to as the forward/backward direction D2.

<Overall Configuration of Image Forming Apparatus>

Figure 1:
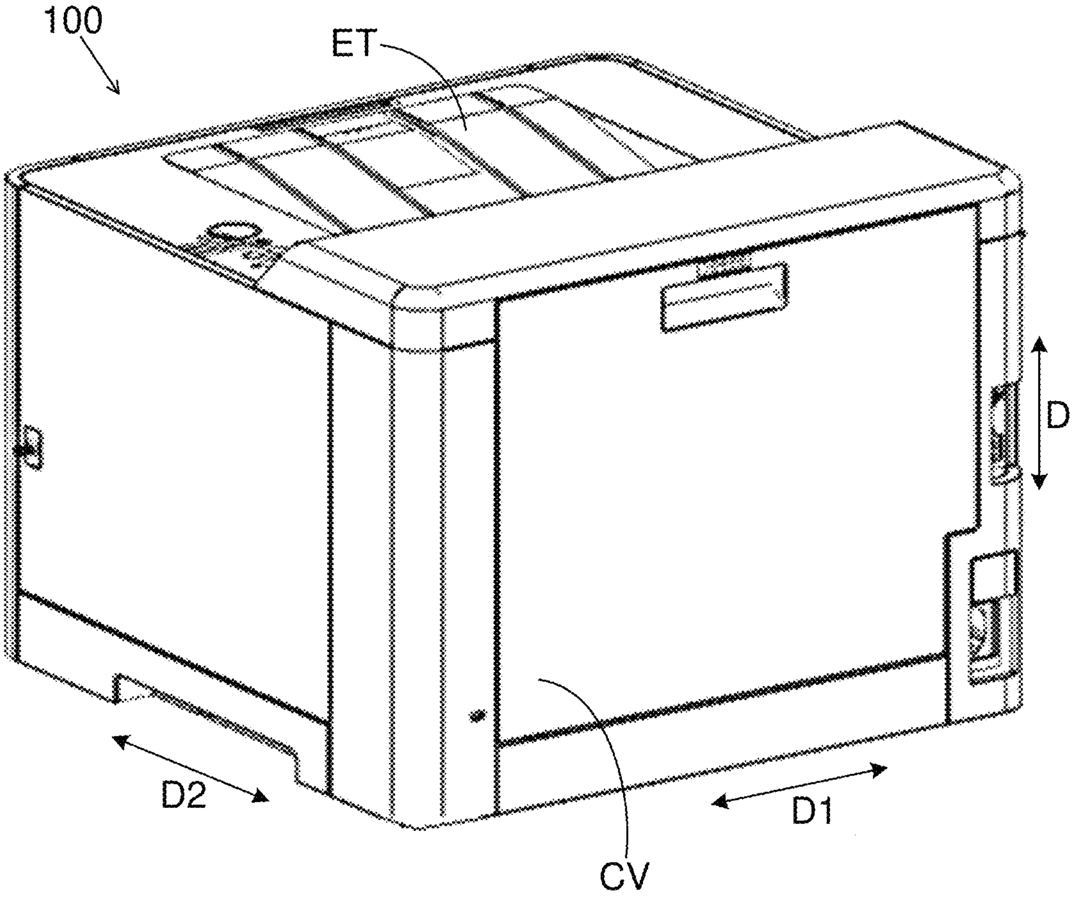
FIG. 1 is a perspective view of an image forming apparatus according to an embodiment.
Figure 2:
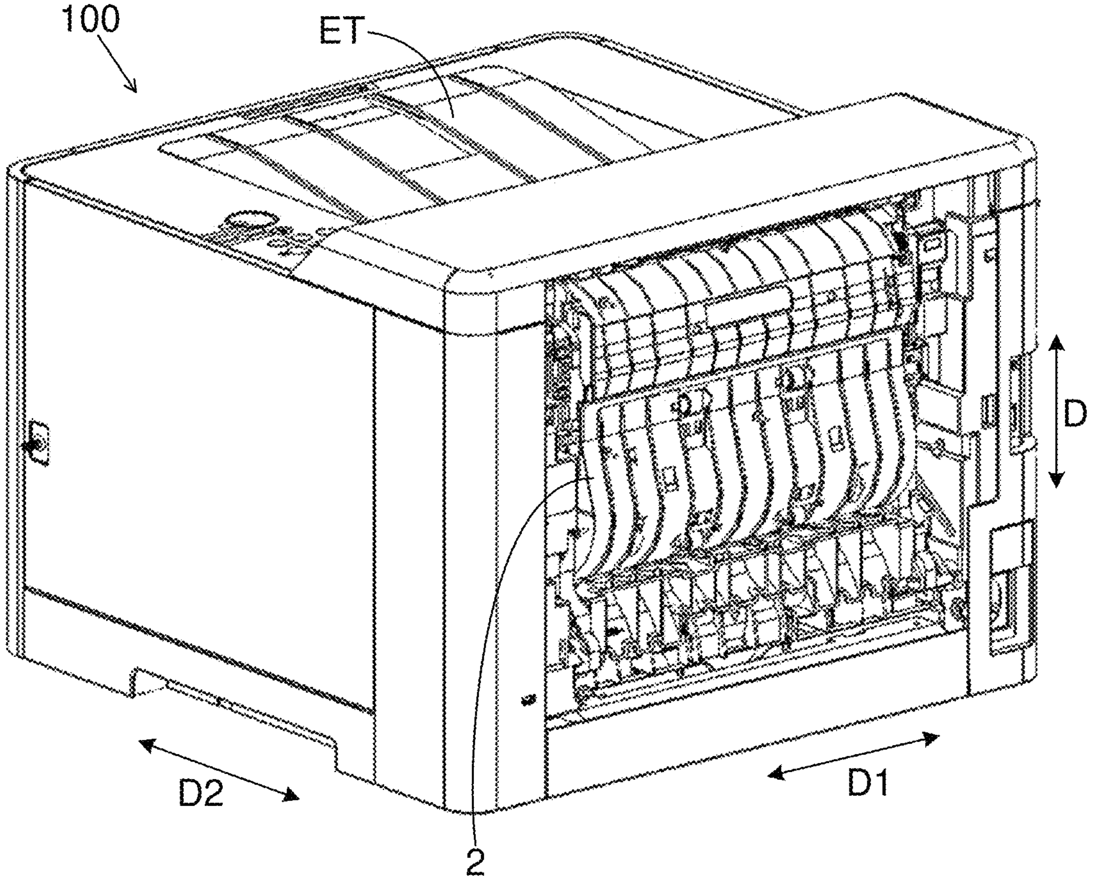
FIG. 2 is a perspective view of the image forming apparatus shown in FIG. 1 in a state where a rear cover is removed.

The image forming apparatus 100 of the present embodiment has an appearance as shown in FIGS. 1 and 2. The image forming apparatus 100 includes a main body frame (symbol of which is omitted). The image forming apparatus 100 also includes a rear cover CV. The main body frame is covered with exterior covers including the rear cover CV (for the other covers, symbols are omitted). In FIG. 2, the rear cover CV is omitted, and a part of the interior of the apparatus is shown.

The main body frame supports the exterior covers. The main body frame supports the rear cover CV such that the rear cover CV can be turned around an axis line extending in the width direction D1. For example, the main body frame includes a turning shaft RA1 (see FIG. 5) which extends in the width direction D1. The turning shaft RA1 supports an end portion of the rear cover CV on a lower side. The rear cover CV is turned with the turning shaft RA1 used as a support point such that an end portion (that is, an end portion on an upper side) on a side opposite to the side supported by the turning shaft RA1 swings. In other words, the rear cover CV is supported such that the rear cover CV can be opened or closed with respect to the main body frame.

The rear cover CV is opened, and thus the interior of the image forming apparatus 100 is exposed to one side (backward side) in the forward/backward direction D2. The rear cover CV is closed, and thus the interior of the image forming apparatus 100 is covered from the one side in the forward/backward direction D2. For example, when a jam of a sheet S occurs in the image forming apparatus 100, the rear cover CV is opened so that the sheet S is removed.

Figure 3:
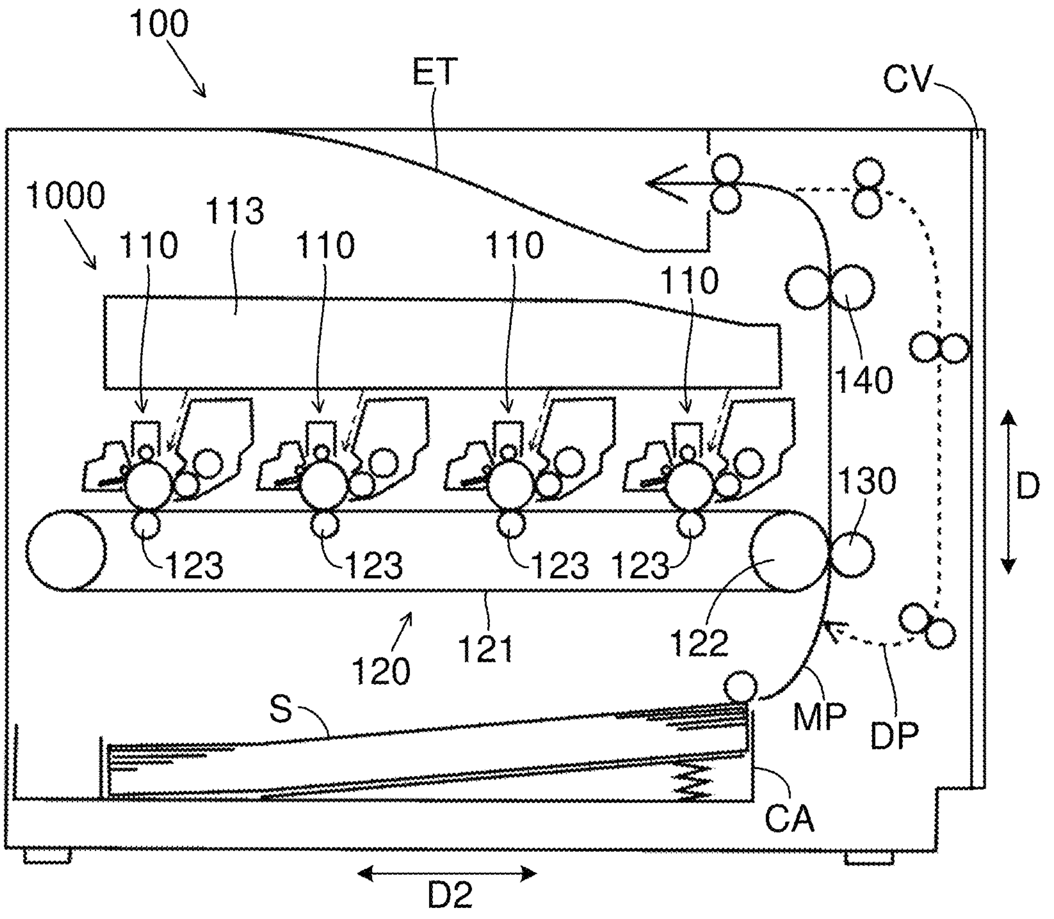
FIG. 3 is a schematic view showing an internal configuration of the image forming apparatus according to the embodiment.

As shown in FIG. 3, the image forming apparatus 100 includes a main conveyance path MP. The main conveyance path MP is passed through a transfer nip which will be described later. In FIG. 3, the main conveyance path MP is schematically indicated by a solid line with an arrow. A double-sided printing conveyance path DP which will be described later is schematically indicated by a dotted line with an arrow.

The image forming apparatus 100 includes a sheet cassette CA. The sheet cassette CA stores sheets S used in a print job. The type of sheet S is not particularly limited.

In the print job, the image forming apparatus 100 supplies the sheet S in the sheet cassette CA to the main conveyance path MP, and conveys the sheet S along the main conveyance path MP. Then, the image forming apparatus 100 prints an image on the sheet S being conveyed. In other words, the image forming apparatus 100 includes a print unit 1000 which prints the image on the sheet S being conveyed.

The print unit 1000 includes image formation units 110 for four colors of cyan, magenta, yellow and black. The image formation units 110 form toner images for the corresponding colors, respectively. With attention focused on a certain image formation unit 110, the configuration of the image formation unit 110 will be described. The image formation units 110 basically have the same configuration. Hence, the description of the configuration of the other image formation units 110 is omitted because the following description can be used for the description.

Figure 4:
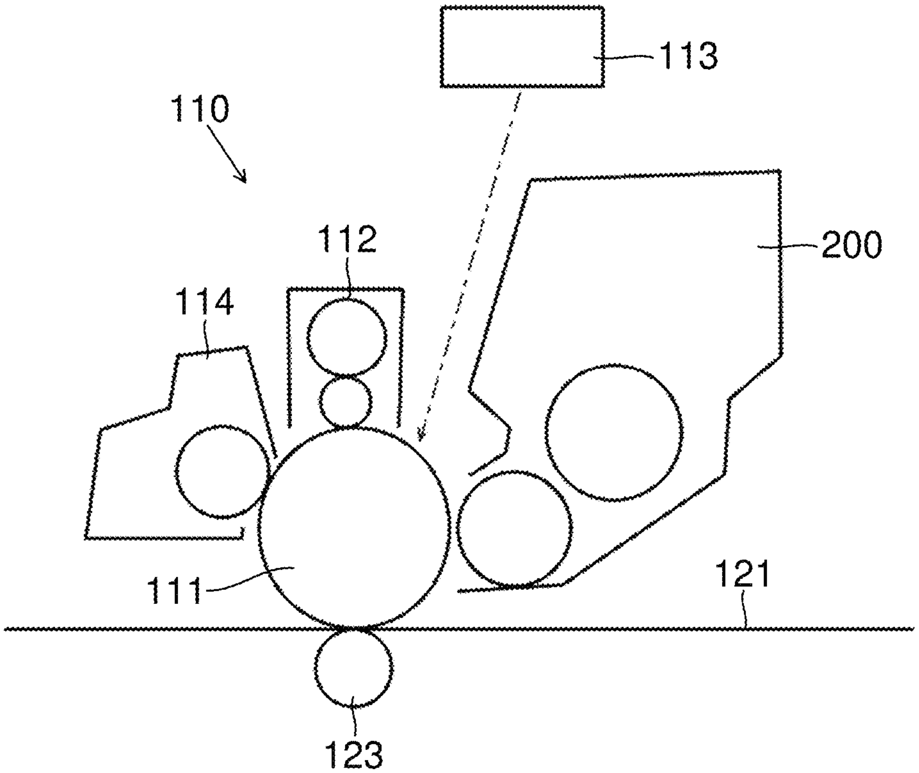
FIG. 4 is a schematic view showing the configuration of an image formation unit in the image forming apparatus according to the embodiment.

As shown in FIG. 4, the image formation unit 110 includes a development cartridge 200. The development cartridge 200 stores the toner of the corresponding color, and uses the toner to perform a development process. The image formation unit 110 includes a photosensitive drum 111 and a charging device 112. The image forming apparatus 100 includes one exposure unit 113 for the image formation units 110 of the four colors. The image formation unit 110 includes a cleaning device 114.

When image formation is performed by the image formation unit 110, the photosensitive drum 111 is rotated. The charging device 112 charges the outer circumferential surface of the photosensitive drum 111. The exposure unit 113 exposes the outer circumferential surface of the photosensitive drum 111 to form an electrostatic latent image on the outer circumferential surface of the photosensitive drum 111. Then, the development cartridge 200 supplies, as the development process, the toner to the outer circumferential surface of the photosensitive drum 111 to develop the electrostatic latent image into the toner image. The toner image on the outer circumferential surface of the photosensitive drum 111 is primarily transferred to an intermediate transfer belt 121 which will be described later. The cleaning device 114 removes the toner which is left on the outer circumferential surface of the photosensitive drum 111 without being transferred to the intermediate transfer belt 121.

With reference back to FIG. 3, the print unit 1000 includes a transfer belt unit 120. The print unit 1000 also includes a secondary transfer roller 130.

The transfer belt unit 120 is arranged below the image formation units 110. The transfer belt unit 120 includes the intermediate transfer belt 121. The intermediate transfer belt 121 is a seamless belt.

The intermediate transfer belt 121 is stretched with a plurality of rollers including a drive roller 122 (for the other rollers, symbols are omitted), and is supported rotatably. The intermediate transfer belt 121 is in contact with the outer circumferential surfaces of the photosensitive drums 111, and is rotated in such a state. The drive roller 122 is rotated by transmission of power from a belt motor (not shown). The drive roller 122 is rotated, and thus the intermediate transfer belt 121 follows the rotation to rotate. The intermediate transfer belt 121 corresponds to an "image carrying member".

The transfer belt unit 120 includes primary transfer rollers 123. The primary transfer rollers 123 are assigned to the individual colors of cyan, magenta, yellow and black, respectively. The primary transfer rollers 123 are arranged on the inner circumferential side of the intermediate transfer belt 121. The primary transfer rollers 123 are respectively arranged opposite the photosensitive drums 111 which carry the toner images of the corresponding colors through the intermediate transfer belt 121.

The secondary transfer roller 130 is arranged opposite the drive roller 122 through the intermediate transfer belt 121. The secondary transfer roller 130 is pressed against the intermediate transfer belt 121. The secondary transfer roller 130 forms the transfer nip between the intermediate transfer belt 121 and itself. The secondary transfer roller 130 corresponds to a "transfer roller".

Each of the image formation units 110 forms the toner image of the corresponding color. Then, each of the primary transfer rollers 123 primarily transfers the toner image to the outer circumferential surface of the intermediate transfer belt 121. The intermediate transfer belt 121 is rotated while carrying, on the outer circumferential surface, the toner images primarily transferred from the photosensitive drums 111. While the sheet S is being passed through the transfer nip, the sheet S makes contact with the outer circumferential surface of the intermediate transfer belt 121. The secondary transfer roller 130 forms a transfer electric field between the intermediate transfer belt 121 and itself to secondarily transfer the toner images to the sheet S being passed through the transfer nip.

The print unit 1000 includes a fixing roller pair 140. The fixing roller pair 140 includes a heating roller and a pressure roller. The heating roller incorporates a heater. The pressure roller is pressed against the heating roller to form a fixing nip between the heating roller and itself. The fixing roller pair 140 is rotated while nipping the sheet S conveyed from the transfer nip. In other words, the fixing roller pair 140 heats and pressurizes the sheet S being passed through the fixing nip. In this way, the fixing roller pair 140 fixes, to the sheet S, the toner images transferred to the sheet S. Thereafter, the sheet S is ejected to an ejection tray ET.

The image forming apparatus 100 can perform, as the print job, not only a single-sided print job for printing the toner images on only one side of the sheet S but also a double-sided print job for printing the toner images on both sides of the sheet S. In order to perform the double-sided print job, the image forming apparatus 100 includes the double-sided printing conveyance path DP.

The double-sided printing conveyance path DP branches from the main conveyance path MP on the downstream side of the fixing nip of the main conveyance path MP in a sheet conveyance direction. Then, the double-sided printing conveyance path DP merges into the main conveyance path MP on the upstream side of the transfer nip of the main conveyance path MP in the sheet conveyance direction.

When the performance job is the single-sided print job, the sheet S is passed through the transfer nip only once, and transfer processing is performed once on the sheet S being passed through the transfer nip. Then, after the first round of the transfer processing, the sheet S is ejected to the ejection tray ET without being processed.

When the performance job is the double-sided print job, the sheet S is passed through the transfer nip twice so that the transfer processing is performed once on each of the front and back surfaces of the sheet S. Specifically, when the sheet S is passed through the transfer nip for the first time, the transfer processing is performed on one side of the sheet S. After the first round of the transfer processing, the sheet S is switched back before the sheet S is fully ejected to the ejection tray ET after the back end of the sheet S is passed through the fixing nip. In this way, the sheet S is drawn into the double-sided printing conveyance path DP from the back end of the sheet S.

Thereafter, the sheet S is conveyed along the double-sided printing conveyance path DP. Then, the sheet S is returned to the main conveyance path MP on the upstream side of the transfer nip in the sheet conveyance direction. The sheet S returned to the main conveyance path MP is passed through the transfer nip again. Here, the directions of the front and back surfaces of the sheet S are reversed from the directions when the sheet S was previously passed through the transfer nip. In this way, when the sheet S is passed through the transfer nip for the second time, the transfer processing is performed on the other side opposite to the one side of the sheet S.

<Units in Apparatus>

The image forming apparatus 100 includes a plurality of units. Some of the units will be described below.

Figure 5:
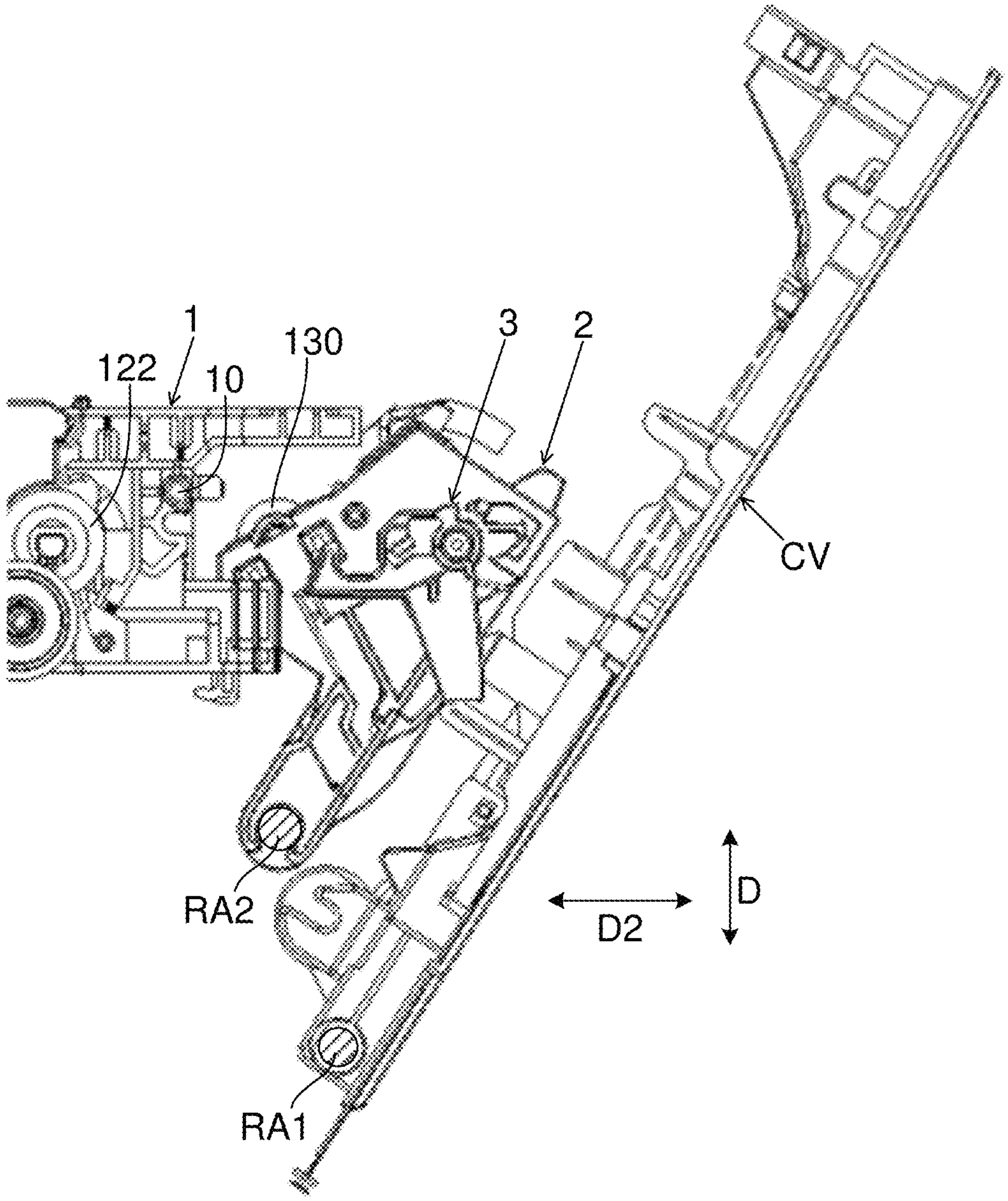
FIG. 5 is a side view in a state where a conveyance unit is separate from a main body-side unit in the image forming apparatus according to the embodiment.

As shown in FIG. 5, the image forming apparatus 100 includes a main body-side unit 1 and a conveyance unit 2. The main body-side unit 1 corresponds to a "first unit", and the conveyance unit 2 corresponds to a "second unit". FIG. 5 shows a state where the rear cover CV is slightly opened (state where the conveyance unit 2 is separate from the main body-side unit 1).

The main body-side unit 1 includes the transfer belt unit 120. In other words, the main body-side unit 1 includes the intermediate transfer belt 121.

The conveyance unit 2 mainly performs the conveyance of the sheet S. The conveyance unit 2 will be described below with reference to FIGS. 5 to 8.

The conveyance unit 2 includes unit-side portions 20. The unit-side portion 20 is arranged on each of one side and the other side in the width direction D1. The pair of unit-side portions 20 are opposite each other in the width direction D1.

The conveyance unit 2 includes conveyance guides G1 which partition parts of the main conveyance path MP. The conveyance guides G1 are located between the pair of unit-side portions 20 in the width direction D1. The conveyance guides G1 partition parts of the main conveyance path MP together with conveyance guides (not shown) in the other units.

The conveyance unit 2 also includes conveyance guides G2 which partition parts of the double-sided printing conveyance path DP. The conveyance guides G2 are located between the pair of unit-side portions 20 in the width direction D1. The conveyance guides G2 partition parts of the double-sided printing conveyance path DP together with a conveyance guide (symbol of which is omitted) provided in the rear cover CV.

Here, the conveyance unit 2 includes the secondary transfer roller 130. However, the conveyance unit 2 is a separate unit from the main body-side unit 1. In this configuration, the intermediate transfer belt 121 and the secondary transfer roller 130 form the transfer nip, and thus the conveyance unit 2 is located with respect to the main body-side unit 1.

The conveyance unit 2 can be turned around an axis line extending in the width direction D1. For example, the main body frame includes a turning shaft RA2 which extends in the width direction D1. The turning shaft RA2 supports an end portion of the conveyance unit 2 on a lower side. The conveyance unit 2 is turned with the turning shaft RA2 used as a support point such that an end portion (that is, an end portion on an upper side) on a side opposite to the side supported by the turning shaft RA2 swings. The conveyance unit 2 is turned around the axis line of the turning shaft RA2, and thus the conveyance unit 2 can be displaced between a first position and a second position.

Figure 6:
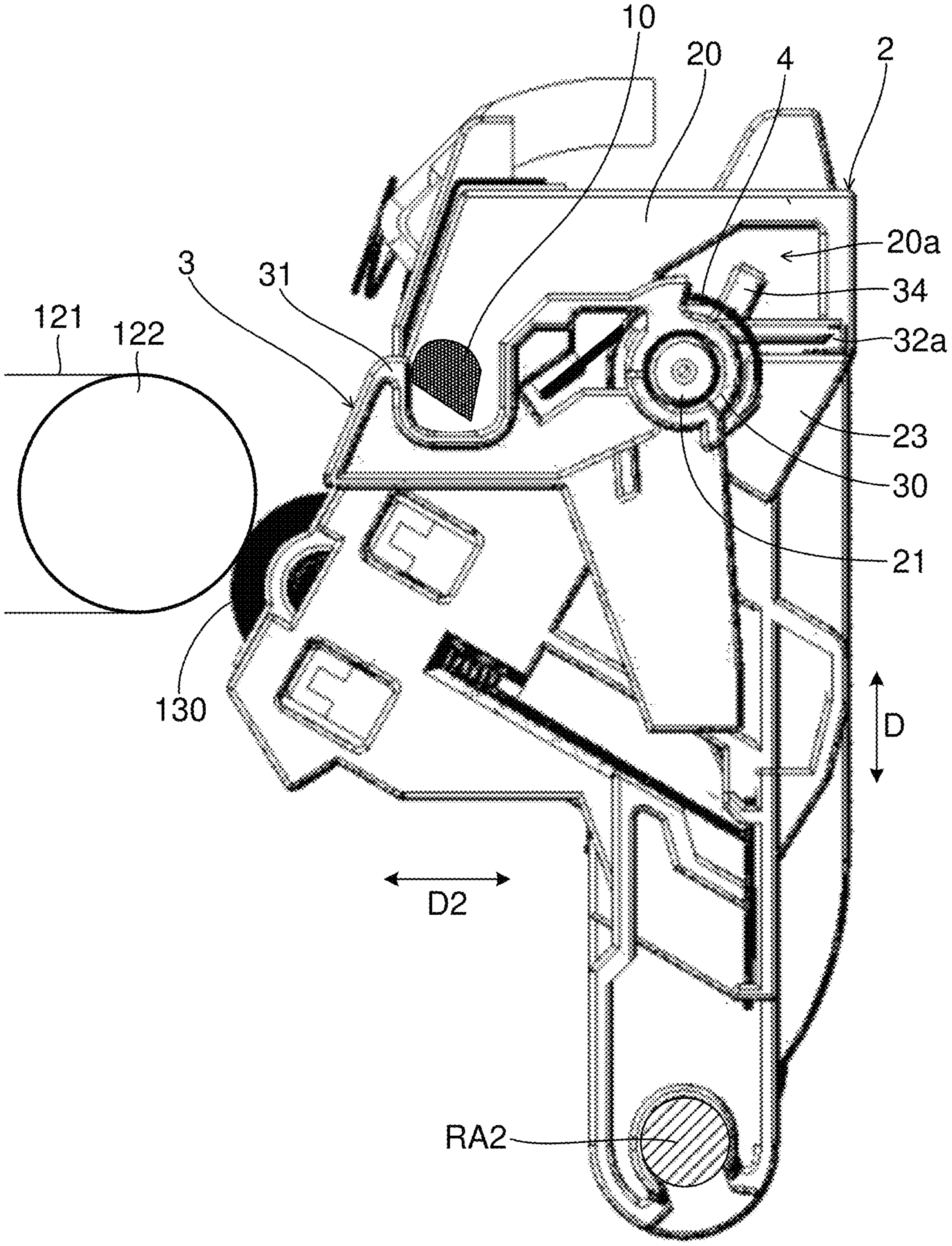
FIG. 6 is a side view of the conveyance unit and a locating member attached to the conveyance unit in the image forming apparatus according to the embodiment.
Figure 7:
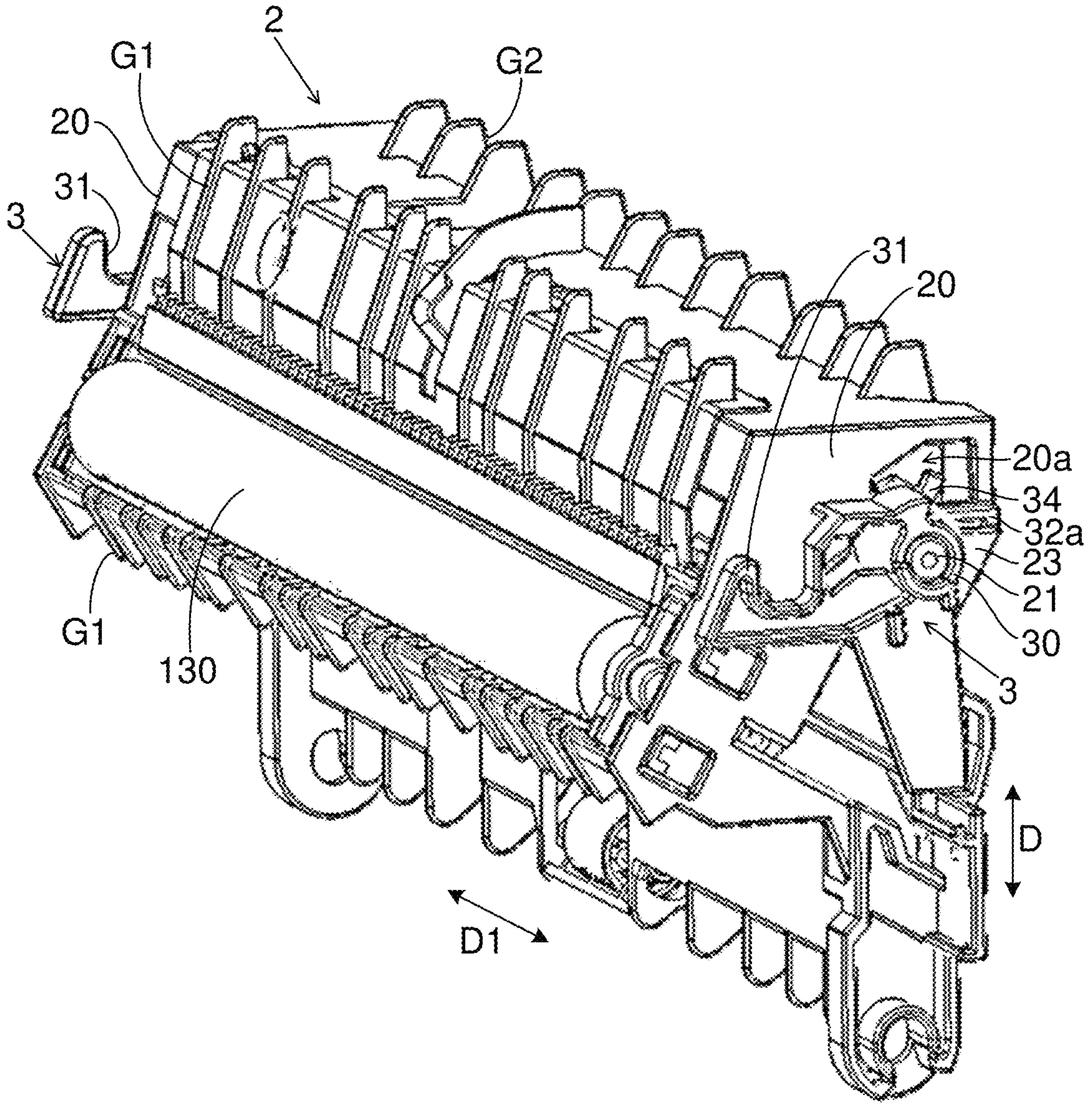
FIG. 7 is a perspective view when the conveyance unit and the locating member attached to the conveyance unit in the image forming apparatus according to the embodiment are viewed from the front.
Figure 8:
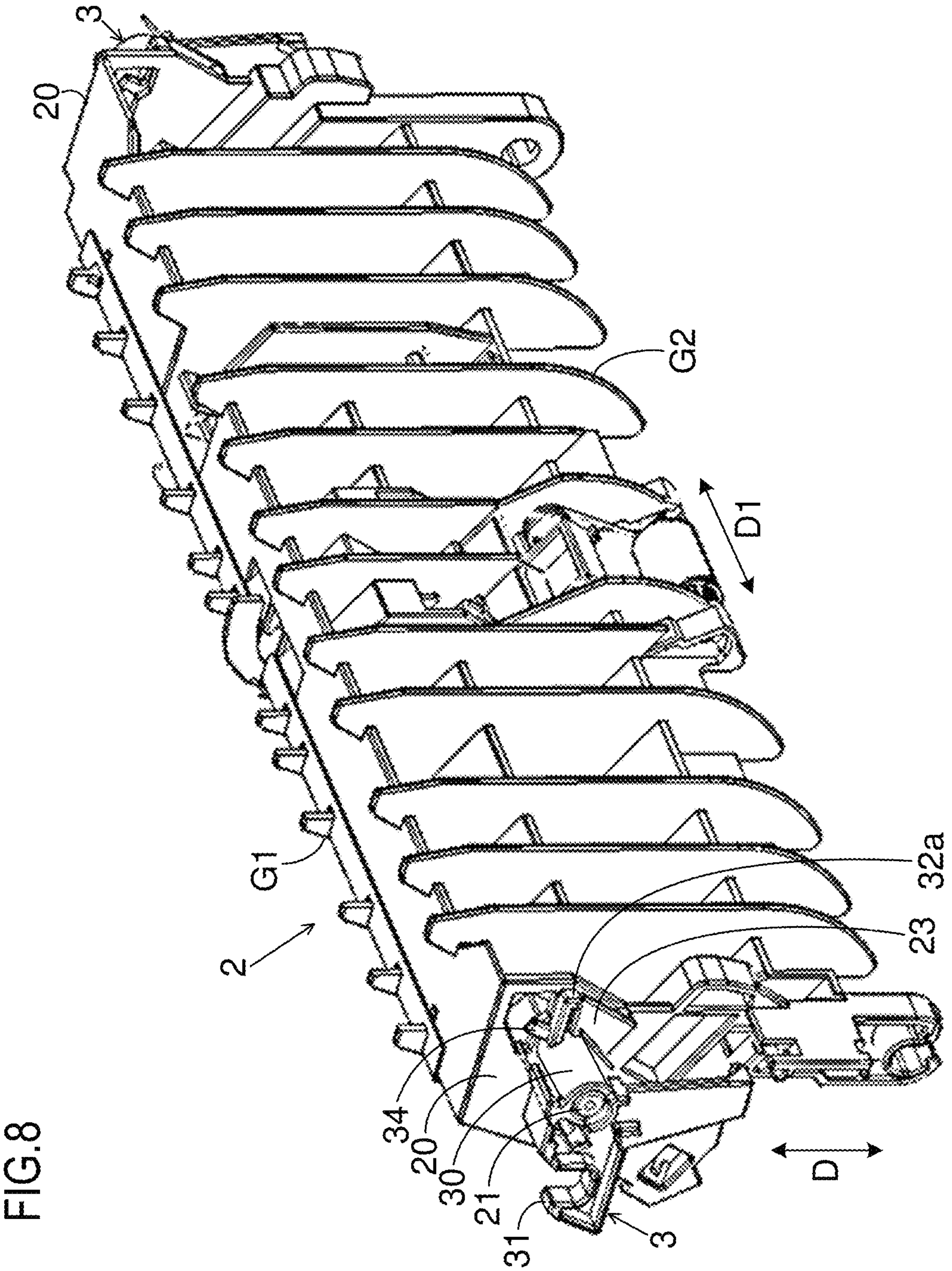
FIG. 8 is a perspective view when the conveyance unit and the locating member attached to the conveyance unit in the image forming apparatus according to the embodiment are viewed from the back.

The first position is a position in which the conveyance unit 2 is located with respect to the main body-side unit 1. The position of the conveyance unit 2 shown in FIG. 6 is the first position. The conveyance unit 2 is retained in the first position (that is, the conveyance unit 2 is located with respect to the main body-side unit 1), and thus the secondary transfer roller 130 is pressed against the intermediate transfer belt 121. In this way, the transfer nip is formed between the intermediate transfer belt 121 and the secondary transfer roller 130.

The second position is a position other than the first position, and is a position in which the conveyance unit 2 is not located with respect to the main body-side unit 1. In a state where the conveyance unit 2 is in the second position, it is impossible to locate the conveyance unit 2 with respect to the main body-side unit 1. The position of the conveyance unit 2 shown in FIG. 5 is the second position.

In a state where the conveyance unit 2 is retained in the first position, a part of the main conveyance path MP is formed by the conveyance guides G1 of the conveyance unit 2 and the conveyance guides of the other units. In a state where the conveyance unit 2 is retained in the first position, and the rear cover CV is closed, a part of the double-sided printing conveyance path DP is formed by the conveyance guides G2 of the conveyance unit 2 and the conveyance guide (symbol of which is omitted) of the rear cover CV.

For example, when a jam occurs while the print job is being performed, a jam processing operation of opening the rear cover CV and turning the conveyance unit 2 to the second position is performed. Since the rear cover CV is opened, and thus the double-sided printing conveyance path DP is exposed, the sheet S jammed in the double-sided printing conveyance path DP can be removed. Since the conveyance unit 2 is turned to the second position, and thus the main conveyance path MP is exposed, the sheet S jammed in the main conveyance path MP can be removed.

After the jam processing operation, an operation of closing the rear cover CV is performed. For example, the rear cover CV is turned in a direction in which the rear cover CV is closed, and thus the conveyance unit 2 is pushed by the rear cover CV. In this way, in synchronization with the closing of the rear cover CV, the conveyance unit 2 is returned to the first position.

In this configuration, it is necessary to reliably retain the conveyance unit 2 in the first position during a normal operation (for example, while the print job is being performed). If the conveyance unit 2 is shifted from the first position while the print job is being performed, the image quality may be lowered or a jam may occur.

Hence, the image forming apparatus 100 includes a locating member 3. The locating member 3 locates the conveyance unit 2 with respect to the main body-side unit 1. In other words, the locating member 3 retains the conveyance unit 2 in the first position. Furthermore, in other words, the locating member 3 restricts the turning of the conveyance unit 2 from the first position to the second position.

<Locating of Unit>

Figure 9:
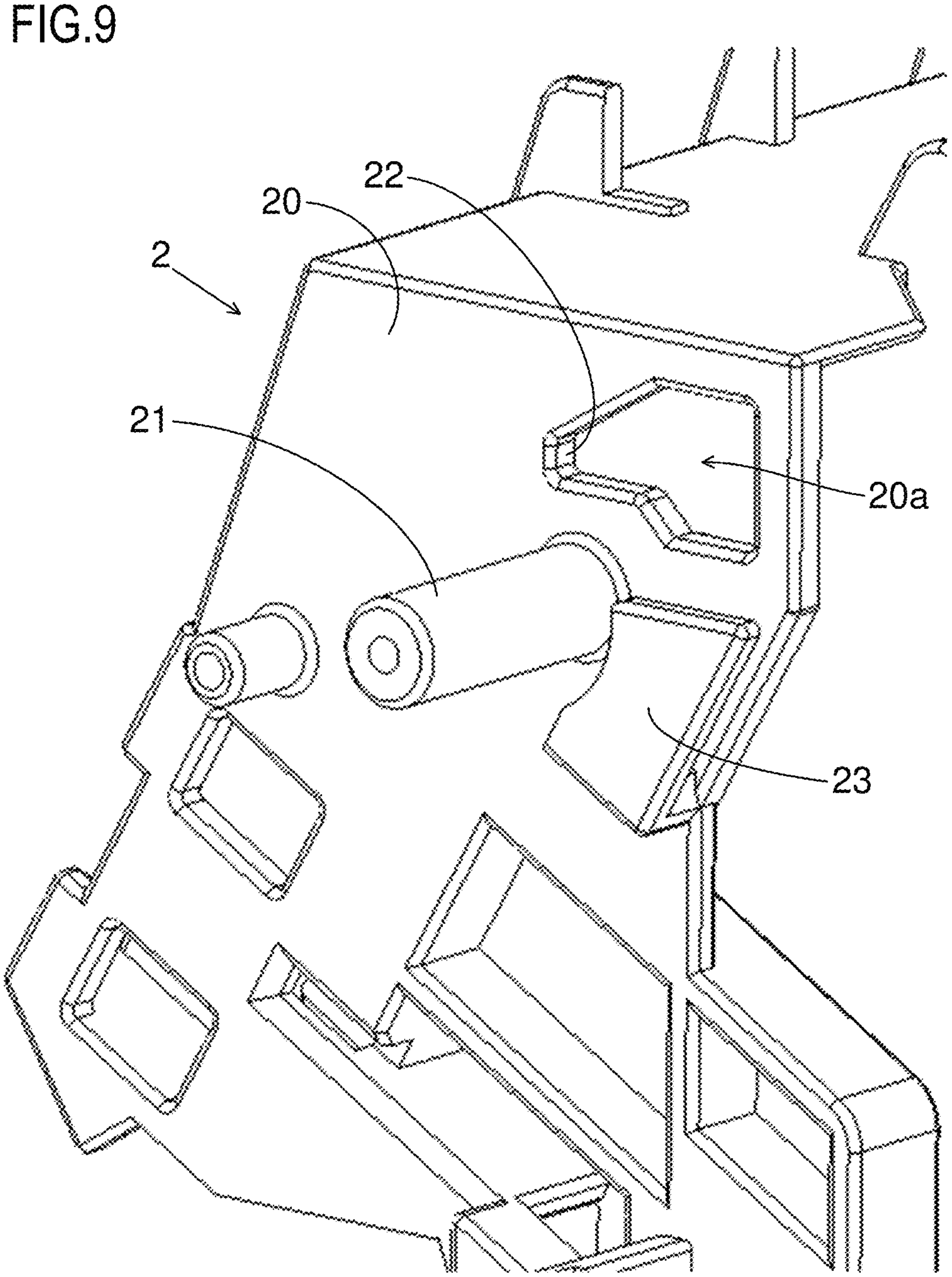
FIG. 9 is an enlarged perspective view of an area around the unit-side portion of the conveyance unit in the image forming apparatus according to the embodiment.
Figure 10:
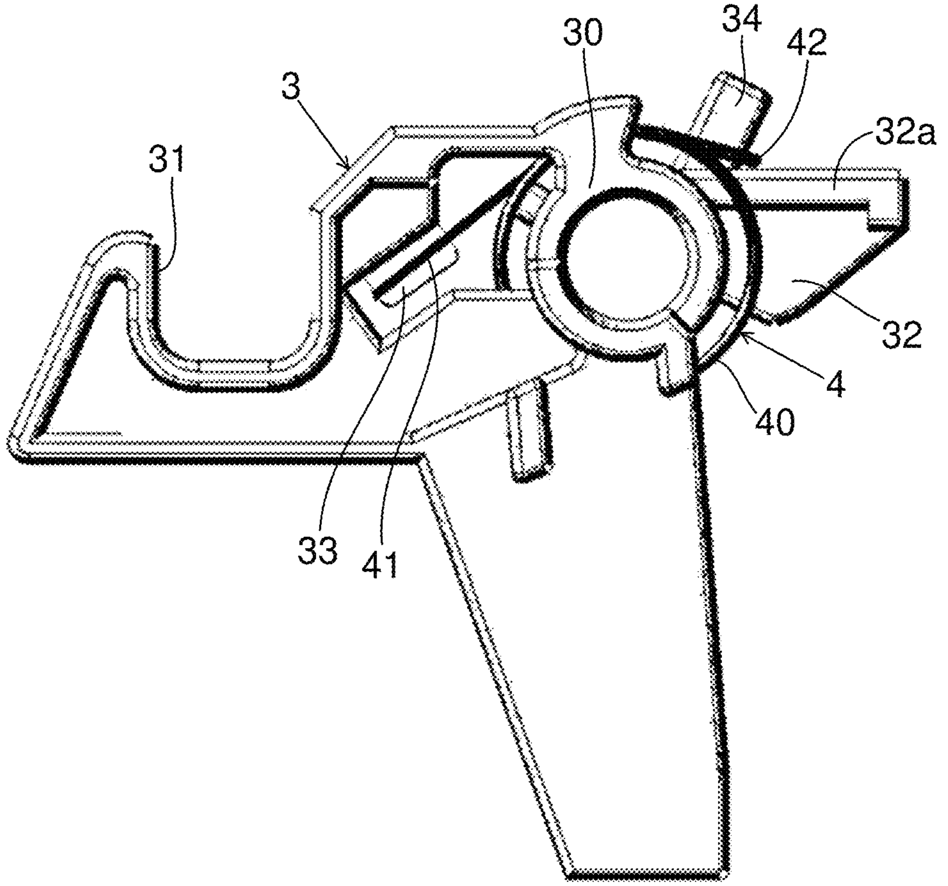
FIG. 10 is a side view of the locating member and a torsion coil spring temporarily fixed to the locating member in the image forming apparatus according to the embodiment.

The structure of the locating member 3 and a structure for attaching the locating member 3 to the conveyance unit 2 will be described below with reference to FIGS. 9 and 10.

The locating member 3 is attached to each of the pair of unit-side portions 20 in the conveyance unit 2. The structure of the locating member 3 and the structure for attaching the locating member 3 to the conveyance unit 2 are the same on each of one side and the other side. Hence, a description will be given below for only the one side, and the description for the other side is omitted because the following description can be used for the description.

The locating member 3 is arranged outward of the unit-side portion 20 in the width direction D1. The secondary transfer roller 130 and the like are arranged inward of the unit-side portion 20 in the width direction D1. The “outward” in the width direction D1 refers to a direction which extends from the center of the conveyance unit 2 in the width direction D1 toward one side or the other side in the width direction D1. The “inward” in the width direction D1 refers to a direction which extends from the one side or the other side of the conveyance unit 2 in the width direction D1 toward the center in the width direction D1.

The unit-side portion 20 includes a support shaft 21 which supports the locating member 3 outward in the width direction D1. The support shaft 21 protrudes outward from the unit-side portion 20 in the shape of a cylinder or a tube. The outer shape of the support shaft 21 is circular when viewed in the width direction D1. For example, the unit-side portion 20 is made of resin. The support shaft 21 is integrally molded with the unit-side portion 20.

The locating member 3 includes a cylindrical portion 30. In a state where the locating member 3 is attached to the unit-side portion 20, the width direction D1 is the direction of the cylindrical shaft of the cylindrical portion 30. The support shaft 21 is inserted into the cylindrical portion 30, and thus the locating member 3 is attached to the unit-side portion 20. The cylindrical portion 30 is fitted to the support shaft 21 from outside in the width direction D1. In the following description, a circumferential direction around the center of the cylindrical shaft of the cylindrical portion 30 fitted to the support shaft 21 (that is, the support shaft 21) when viewed in the width direction D1 is simply referred to as a circumferential direction.

The cylindrical portion 30 can slide in the circumferential direction with respect to the outer circumferential surface of the support shaft 21. In other words, the support shaft 21 supports the locating member 3 such that the locating member 3 can be displaced in the circumferential direction. The cylindrical portion 30 can also slide in the width direction D1 with respect to the outer circumferential surface of the support shaft 21.

The locating member 3 includes a hook portion 31. The hook portion 31 is arranged radially outward of the cylindrical portion 30 when viewed in the width direction D1. The hook portion 31 is a part which extends radially outward of the cylindrical portion 30 (that is, in a direction away from the cylindrical portion 30) when viewed in the width direction D1, and is a hook-shaped part which can engage with a boss portion 10 to be described later from one side in the circumferential direction. The cylindrical portion 30 is displaced in the circumferential direction, and thus the hook portion 31 is turned around the center of the cylindrical shaft of the cylindrical portion 30.

In order to use the locating member 3 to retain the conveyance unit 2 in the first position, the main body-side unit 1 includes the boss portion 10 (see FIGS. 5 and 6) which protrudes in the width direction D1. The boss portion 10 is arranged on the turning path of the hook portion 31 when the hook portion 31 is turned around the center of the cylindrical shaft of the cylindrical portion 30 as viewed in the width direction D1 (that is, when the hook portion 31 is turned in the circumferential direction).

When the conveyance unit 2 is in the first position, the hook portion 31 engages with the boss portion 10 so as to hold the boss portion 10 from the one side in the circumferential direction. In this way, the hook portion 31 restricts the turning of the conveyance unit 2 from the first position to the second position. Consequently, the conveyance unit 2 is retained in the first position. In other words, the conveyance unit 2 is located with respect to the main body-side unit 1.

However, the locating member 3 is not fixed to the unit-side portion 20 (that is, the conveyance unit 2). In other words, the locating member 3 is removable with respect to the unit-side portion 20. In this configuration, if some countermeasure is not taken, the cylindrical portion 30 may come off the support shaft 21 such that the locating member 3 drops off the unit-side portion 20.

If the locating member 3 drops off the unit-side portion 20, the engagement of the hook portion 31 with the boss portion 10 is released, and thus the conveyance unit 2 is turned from the first position to the second position. In other words, the conveyance unit 2 is shifted with respect to the main body-side unit 1.

In order to suppress such inconvenience, the unit-side portion 20 includes a restriction portion 23. The locating member 3 includes a portion to be restricted 32.

The portion to be restricted 32 is arranged radially outward of the cylindrical portion 30 and in a position different from the hook portion 31 in the circumferential direction when viewed in the width direction D1. For example, the locating member 3 includes a part 32*a* which extends radially outward of the cylindrical portion 30 when viewed in the width direction D1, and includes, as the portion to be restricted 32, a protrusion part which protrudes from the part 32*a* to the one side in the circumferential direction. The cylindrical portion 30 can be displaced in the circumferential direction. Hence, the portion to be restricted 32 arranged radially outward of the cylindrical portion 30 can be turned around the center of the cylindrical shaft of the cylindrical portion 30.

The restriction portion 23 is arranged in a predetermined position (which is hereinafter referred to as a restriction position) on the turning path of the portion to be restricted 32 which is turned around the center of the cylindrical shaft of the cylindrical portion 30 when viewed in the width direction D1. The hook portion 31 is caused to engage with the boss portion 10 from the one side in the circumferential direction, and thus the portion to be restricted 32 is arranged in the restriction position. In this way, in a state where the hook portion 31 engages with the boss portion 10 from the one side in the circumferential direction, the restriction portion 23 overlaps the portion to be restricted 32 from the outside in the width direction D1.

In a state where the restriction portion 23 overlaps the portion to be restricted 32 from the outside in the width direction D1, even when the portion to be restricted 32 (that is, the locating member 3) attempts to move outward in the width direction D1, the portion to be restricted 32 collides with the restriction portion 23. In other words, the restriction portion 23 restricts the movement of the locating member 3 outward in the width direction D1. Consequently, it is possible to suppress the dropping of the locating member 3 off the unit-side portion 20.

However, when the locating member 3 is displaced to the other side in the circumferential direction, the restriction portion 23 and the portion to be restricted 32 do not overlap each other in the width direction D1. In this case, the locating member 3 inconveniently drops off the unit-side portion 20.

Hence, the image forming apparatus 100 further includes a torsion coil spring 4. The torsion coil spring 4 is attached to the locating member 3. The torsion coil spring 4 uses its biasing force to restrict the displacement of the locating member 3 to the other side in the circumferential direction.

The torsion coil spring 4 includes a winding spring portion 40 (that is, a coil-shaped part). The winding spring portion 40 is fitted to the cylindrical portion 30 to be arranged on the outer circumference of the cylindrical portion 30. In other words, the cylindrical portion 30 is inserted into the winding spring portion 40. The winding spring portion 40 is fitted to the cylindrical portion 30, and thus the torsion coil spring 4 is attached to the locating member 3.

The torsion coil spring 4 includes a first arm portion 41 which extends from one end of the winding spring portion 40 and a second arm portion 42 which extends from the other end of the winding spring portion 40. Each of the first arm portion 41 and the second arm portion 42 extends tangentially to the winding spring portion 40 when viewed in the width direction D1.

The first arm portion 41 engages with the locating member 3. Specifically, the locating member 3 includes a first engagement portion 33. The first engagement portion 33 is arranged radially outward of the cylindrical portion 30 when viewed in the width direction D1. The first arm portion 41 engages with the first engagement portion 33.

The second arm portion 42 engages with the conveyance unit 2. Specifically, a second engagement portion 22 is provided in the unit-side portion 20. An edge portion of an opening 20*a* which penetrates the unit-side portion 20 in the width direction D1 functions as the second engagement portion 22. The second arm portion 42 engages with the second engagement portion 22.

The first arm portion 41 engages with the first engagement portion 33 (that is, the locating member 3), the second arm portion 42 engages with the second engagement portion 22 (that is, the unit-side portion 20) and thus the torsion coil spring 4 generates a force for biasing the locating member 3 to the one side in the circumferential direction. In other words, the torsion coil spring 4 biases the locating member 3 in a direction which causes the hook portion 31 to engage with the boss portion 10 (that is, to the one side in the circumferential direction). Furthermore, in other words, the torsion coil spring 4 restricts the displacement of the locating member 3 to the other side in the circumferential direction.

In the present embodiment, it is possible to suppress the displacement of the locating member 3 to the other side in the circumferential direction. When the locating member 3 is not displaced to the other side in the circumferential direction, the overlapping of the restriction portion 23 and the portion to be restricted 32 in the width direction D1 is maintained, and thus it is possible to suppress the dropping of the locating member 3 off the unit-side portion 20. In this way, it is possible to suppress the turning of the conveyance unit 2 from the first position to the second position. In other words, it is possible to suppress the shifting of the conveyance unit 2 with respect to the main body-side unit 1.

In the present embodiment, the torsion coil spring 4 is used in order to restrict the turning of the conveyance unit 2 from the first position to the second position. The torsion coil spring 4 is used, and thus it is possible to reliably restrict, with the locating member 3, the turning of the conveyance unit 2 (that is, the shifting of the conveyance unit 2) without fixing the locating member 3 to the unit-side portion 20. In other words, it is possible to suppress the dropping of the locating member 3 off the unit-side portion 20 caused by the displacement of the locating member 3 in the circumferential direction without fixing the locating member 3 to the unit-side portion 20. When the locating member 3 is not fixed to the unit-side portion 20, it is easy to disassemble the locating member 3 and an area therearound (for example, to remove the locating member 3 from the unit-side portion 20).

In the present embodiment, in the configuration in which the turning of the conveyance unit 2 (that is, the shifting thereof) is restricted with the locating member 3, it is possible to suppress the shifting of the conveyance unit 2 while suppressing a decrease in the disassembly of the locating member 3 and the area therearound. An operation of removing the locating member 3 from the conveyance unit 2 is only to release the engagement of the second arm portion 42 of the torsion coil spring 4 with the second engagement portion 22 of the unit-side portion 20 and to turn the locating member 3 to the other side in the circumferential direction.

<Attachment of Locating Member>

The locating member 3 includes a temporary fixing portion 34. The temporary fixing portion 34 can engage with the second arm portion 42 of the torsion coil spring 4. The temporary fixing portion 34 is used when the locating member 3 is attached to the unit-side portion 20 (that is, the conveyance unit 2).

Figure 11:
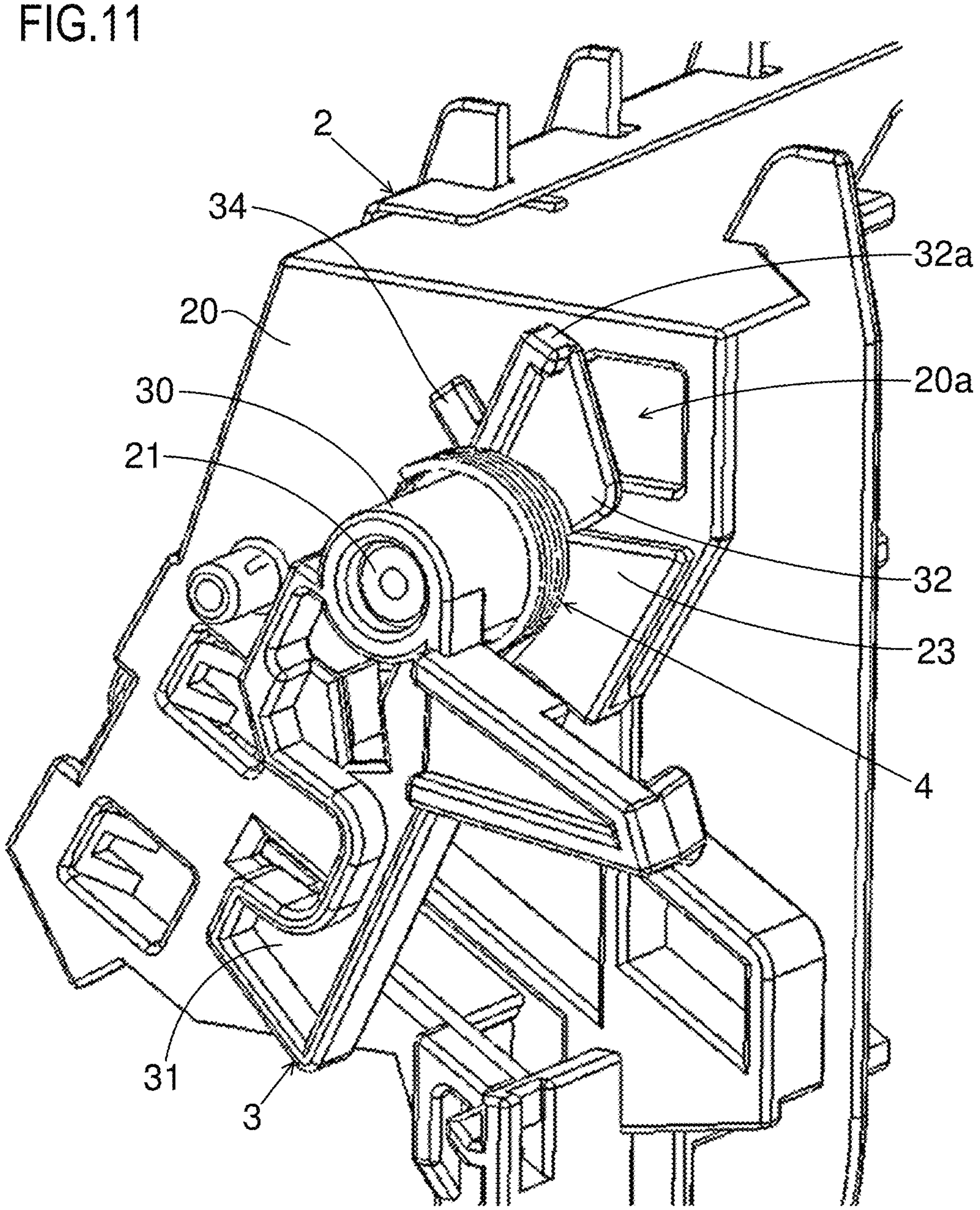
FIG. 11 is a perspective view for illustrating a step of attaching the locating member in the embodiment.
Figure 12:
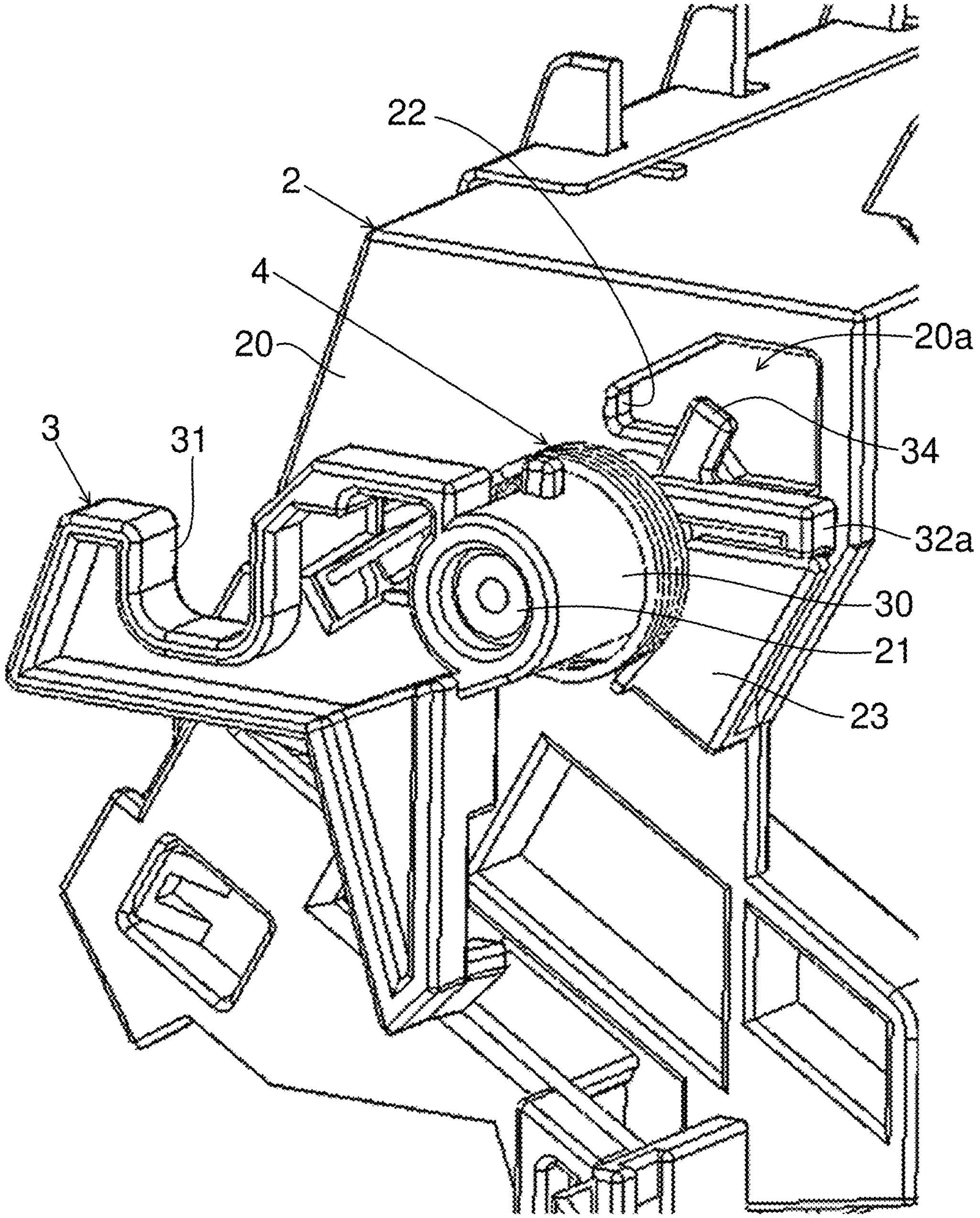
FIG. 12 is a perspective view in a state where the locating member shown in FIG. 11 is turned to one side in a circumferential direction.
Figure 13:
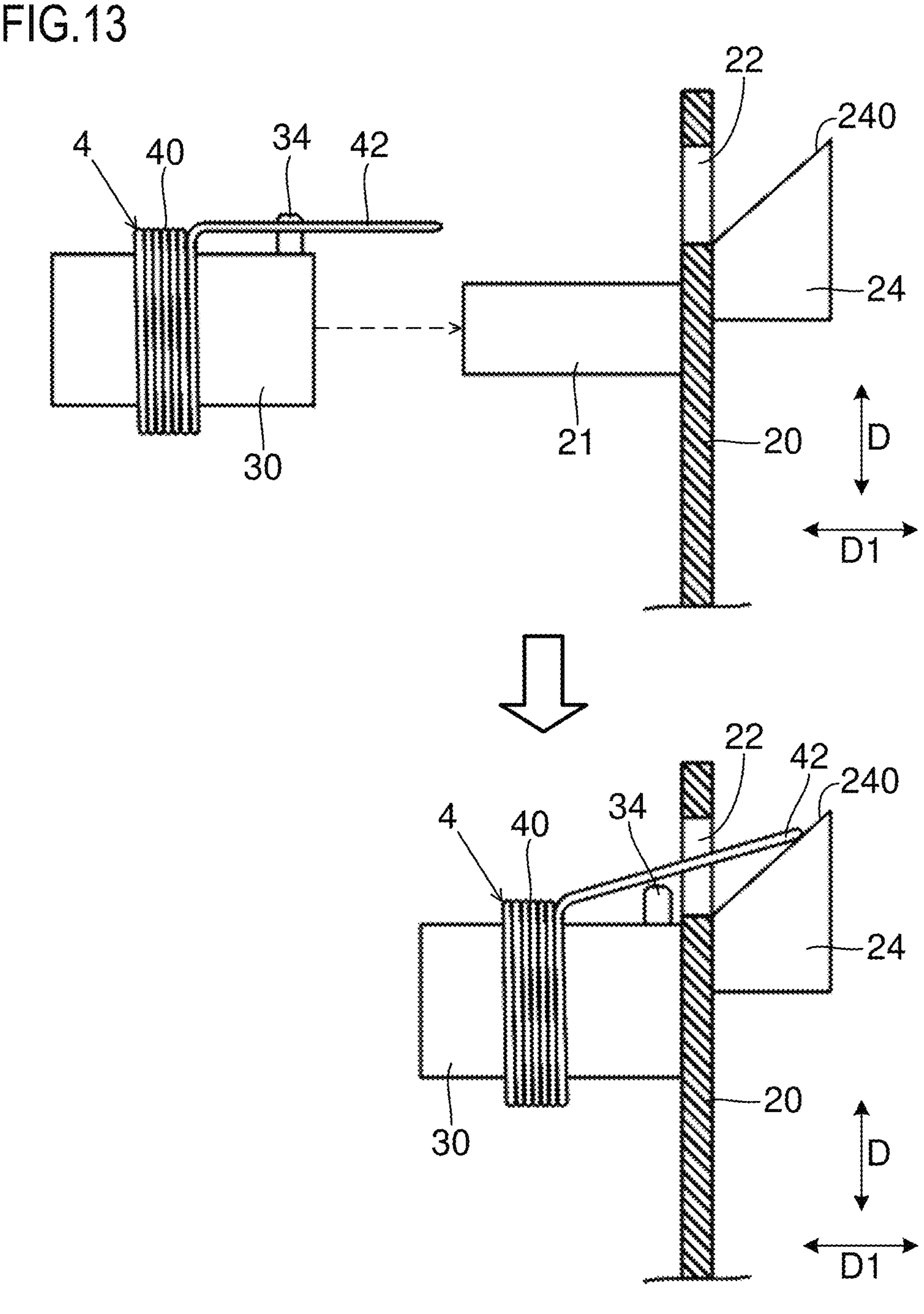
FIG. 13 is a schematic view for illustrating a step of attaching a locating member in a variation.

A step of attaching the locating member 3 to the unit-side portion 20 will be described below with reference to FIGS. 11 and 12.

The torsion coil spring 4 is first attached to the locating member 3 before the locating member 3 is attached to the unit-side portion 20. Here, the winding spring portion 40 is fitted to the cylindrical portion 30, and the first arm portion 41 is caused to engage with the first engagement portion 33. Furthermore, the second arm portion 42 is caused to engage with the temporary fixing portion 34. In other words, the torsion coil spring 4 is temporarily fixed to the locating member 3.

Then, the cylindrical portion 30 is fitted to the support shaft 21. Here, the portion to be restricted 32 is retained so as not to overlap the restriction portion 23 in the width direction D1, and in this state, the cylindrical portion 30 is fitted to the support shaft 21. In this way, a state shown in FIG. 11 is achieved. Until the fitting of the cylindrical portion 30 to the support shaft 21 is completed, the engagement of the second arm portion 42 with the temporary fixing portion 34 is maintained.

After the cylindrical portion 30 is fitted to the support shaft 21, the engagement of the second arm portion 42 is switched from the temporary fixing portion 34 to the second engagement portion 22 (that is, the unit-side portion 20). Here, an operator grasps the second arm portion 42, removes the second arm portion 42 from the temporary fixing portion 34 and causes the second arm portion 42 to engage with the second engagement portion 22.

The winding spring portion 40 is fitted to the cylindrical portion 30, and in a state where the first arm portion 41 engages with the first engagement portion 33, the second arm portion 42 is caused to engage with the second engagement portion 22, with the result that the force for biasing the locating member 3 to the one side in the circumferential direction is generated in the torsion coil spring 4. Consequently, a state shown in FIG. 12, that is, a state where the portion to be restricted 32 and the restriction portion 23 overlap each other in the width direction D1 is retained.

In the present embodiment, the temporary fixing portion 34 is provided in the locating member 3, and thus workability when the locating member 3 is attached to the unit-side portion 20 is enhanced. Specifically, the winding spring portion 40 is fitted to the cylindrical portion 30, the first arm portion 41 is caused to engage with the first engagement portion 33 and the second arm portion 42 is caused to engage with the temporary fixing portion 34, with the result that a state where the torsion coil spring 4 is biased in the direction of torsion is retained. In this way, during the operation of attaching the locating member 3 to the unit-side portion 20 (specifically, before the cylindrical portion 30 is fitted to the support shaft 21), it is possible to suppress the dropping of the torsion coil spring 4 off the locating member 3. This is convenient for the operator because during the operation of attaching the locating member 3 to the unit-side portion 20, it is not necessary to pay attention to the dropping of the torsion coil spring 4.

As a variation, the following configuration may be adopted. The variation will be described below with reference to FIG. 13.

In the variation, the conveyance unit 2 includes a guide portion 24. The guide portion 24 is arranged inward of the unit-side portion 20 in the width direction D1. The guide portion 24 includes an inclination surface 240 which is inclined upward from outside to inside in the width direction D1.

The inclination surface 240 is arranged on the movement path of the tip of the second arm portion 42 when the cylindrical portion 30 is fitted to the support shaft 21 (specifically, the tip of the second arm portion 42 on a side opposite to the side of the connection to the winding spring portion 40). Specifically, when the cylindrical portion 30 is fitted to the support shaft 21 in a state where the second arm portion 42 engages with the temporary fixing portion 34, the tip of the second arm portion 42 reaches the inclination surface 240 of the guide portion 24 arranged inward of the unit-side portion 20 in the width direction D1 from the outside of the unit-side portion 20 in the width direction D1 through the second engagement portion 22 (that is, the opening 20*a* which penetrates the unit-side portion 20 in the width direction D1). In other words, the second arm portion 42 makes contact with the inclination surface 240. Thereafter, the second arm portion 42 is moved along the inclination surface 240.

The second arm portion 42 is moved along the inclination surface 240, and thus the position of the tip of the second arm portion 42 in the up/down direction is displaced upward. In other words, the second arm portion 42 is displaced upward beyond a position which allows engagement with the temporary fixing portion 34. In this way, the engagement of the second arm portion 42 with the temporary fixing portion 34 is released. Then, the second arm portion 42 released from the temporary fixing portion 34 engages with the second engagement portion 22 (that is, the edge portion of the opening 20*a* of the unit-side portion 20).

In the variation, the cylindrical portion 30 is fitted to the support shaft 21, and thus the engagement of the second arm portion 42 is switched from the temporary fixing portion 34 to the second engagement portion 22 without the operation of switching the engagement of the second arm portion 42 from the temporary fixing portion 34 to the second engagement portion 22 being performed. Since the operation of switching the engagement of the second arm portion 42 from the temporary fixing portion 34 to the second engagement portion 22 is not performed additionally, the convenience of the operator is enhanced, It should be considered that the embodiment disclosed herein is illustrative in all respects, and not restrictive. The scope of the present disclosure is indicated not by the description of the above embodiment but by the scope of claims, and furthermore, meanings equivalent to the scope of claims and all changes in the scope are included therein.

What is claimed is:

1. A unit locating mechanism comprising:

a first unit that includes a boss portion;

a second unit that can be displaced between a first position located with respect to the first unit and a second position other than the first position by being turned around an axis line extending in a predetermined direction; and a locating member that retains the second unit in the first position, wherein the locating member includes:

a cylindrical portion in which the predetermined direction is a direction of a cylindrical shaft;

a hook portion that is arranged radially outward of the cylindrical portion when viewed in the predetermined direction and engages with the boss portion so as to hold the boss portion from one side in a circumferential direction around a center of the cylindrical shaft of the cylindrical portion; and a portion to be restricted that is arranged radially outward of the cylindrical portion and in a position different from the hook portion in the circumferential direction when viewed in the predetermined direction, the second unit includes:

a unit-side portion;

a support shaft which protrudes outward in the predetermined direction from the unit-side portion, to which the cylindrical portion is fitted from outside in the predetermined direction and which supports the locating member such that the locating member can be displaced in the circumferential direction; and a restriction portion that is arranged on a turning path of the portion to be restricted which is turned around the center of the cylindrical shaft of the cylindrical portion when viewed in the predetermined direction, the hook portion engages with the boss portion when the second unit is in the first position to restrict the turning of the second unit from the first position to the second position, the restriction portion overlaps, in a state where the hook portion engages with the boss portion, the portion to be restricted from the outside in the predetermined direction so as to restrict movement of the locating member outward in the predetermined direction, the unit locating mechanism further includes a torsion coil spring that includes a winding spring portion which is arranged on the cylindrical portion, a first arm portion which extends from one end of the winding spring portion and a second arm portion which extends from an other end of the winding spring portion and the first arm portion engages with the locating member, and the second arm portion engages with the unit-side portion such that the torsion coil spring biases the locating member in a direction which causes the hook portion to engage with the boss portion.

2. The unit locating mechanism according to claim 1, wherein the locating member includes a temporary fixing portion that can engage with the second arm portion.

3. The unit locating mechanism according to claim 2, wherein the unit-side portion includes, as an engagement portion with which the second arm portion engages, an edge portion of an opening that penetrates in the predetermined direction, the second unit includes an inclination surface that is arranged inward of the unit-side portion in the predetermined direction and is inclined upward from the outside to inside in the predetermined direction and when the cylindrical portion is fitted to the support shaft in a state where the second arm portion engages with the temporary fixing portion, the second arm portion reaches the inclination surface through the opening, moves along the inclination surface to release the engagement of the second arm with the temporary fixing portion and engages with the edge portion of the opening.

4. An image forming apparatus comprising:

the unit locating mechanism according to claim 1, wherein the first unit is a unit that includes an image carrying member which carries an image, the second unit is a unit that includes a transfer roller which is pressed against the image carrying member and a sheet is conveyed into a transfer nip formed between the image carrying member and the transfer roller, and the image is transferred to the sheet.

* * * * *